A. OLIVER.
STEAM CABINET COOKER.
APPLICATION FILED AUG. 28, 1907.
918,898.
Patented Apr. 20, 1909.
3 SHEETS—SHEET 1.
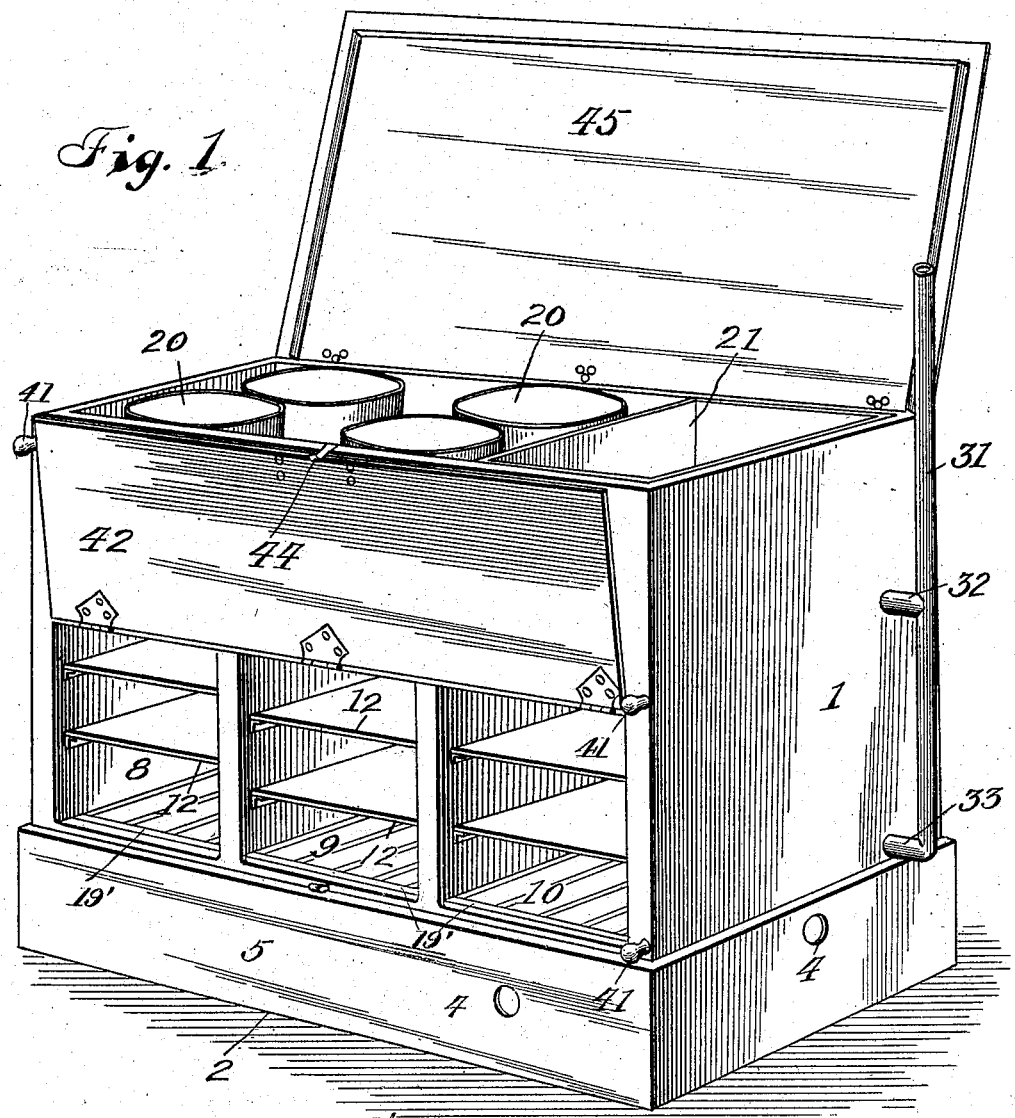
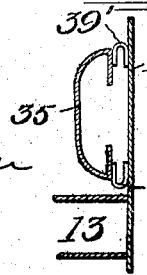
WITNESSES:
C. H. Walker
G. A. Cotter.
INVENTOR
Arthur Oliver
BY
E. E. Vrooman
his Attorney

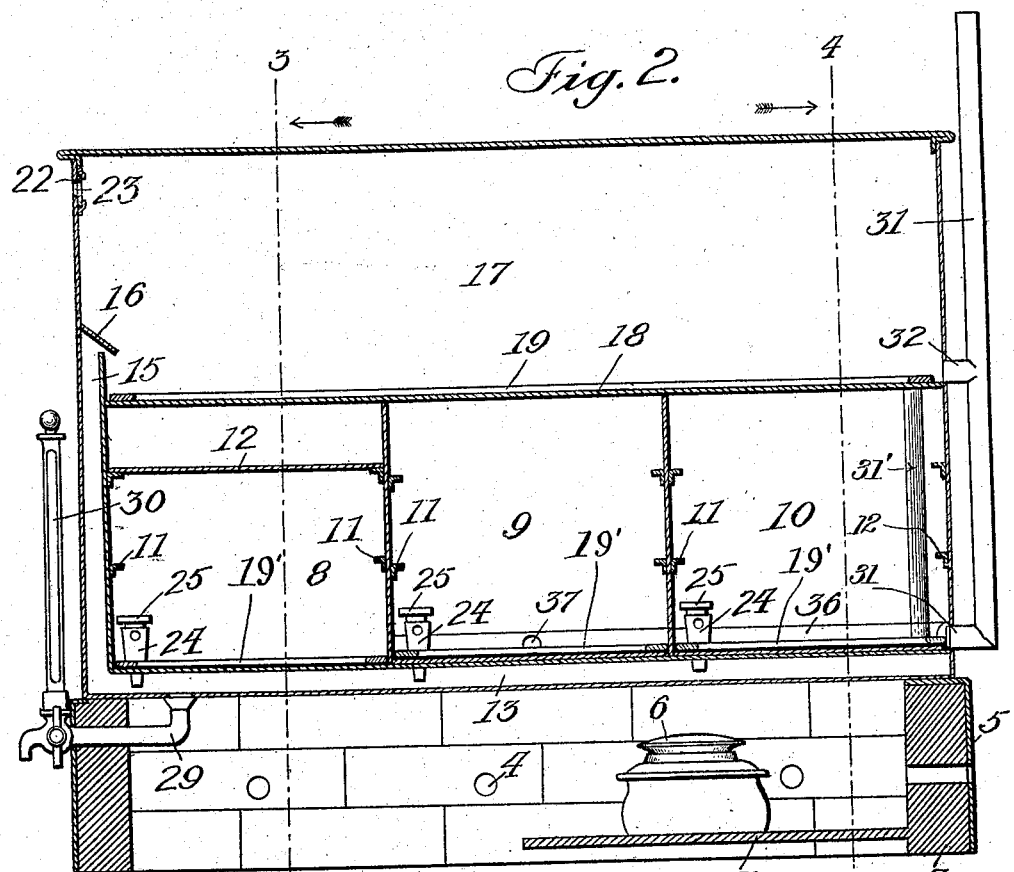

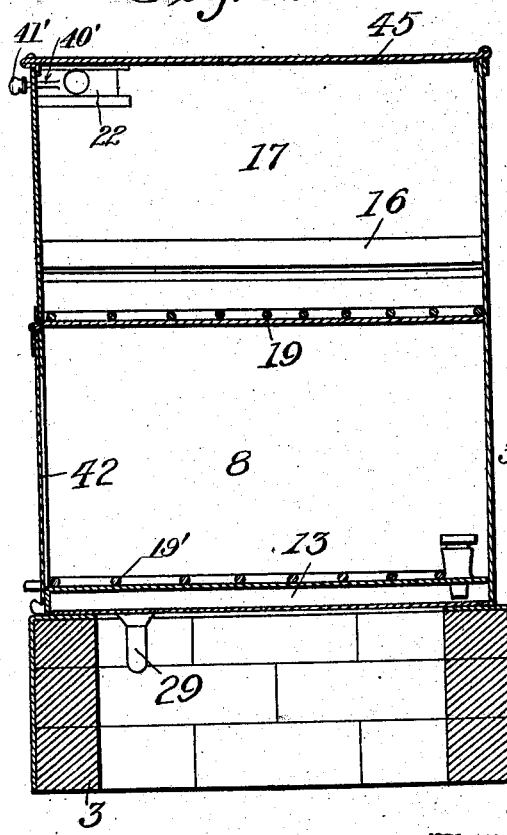
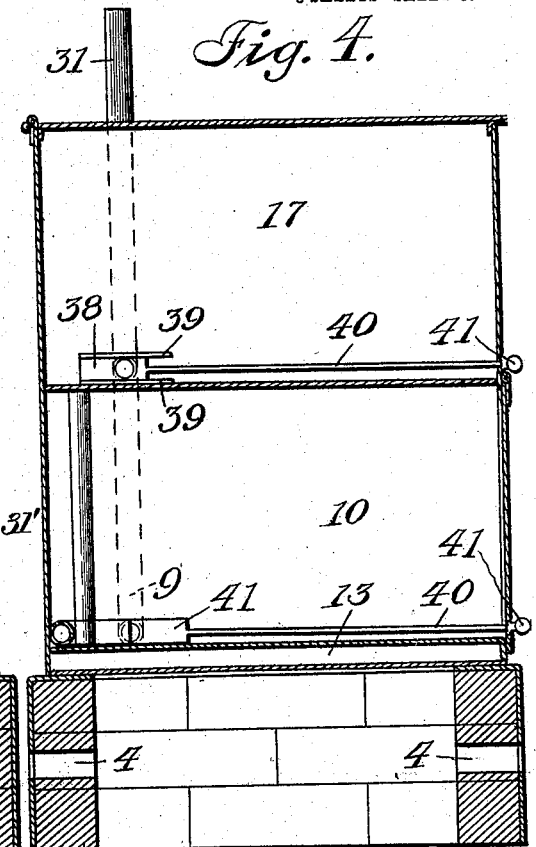
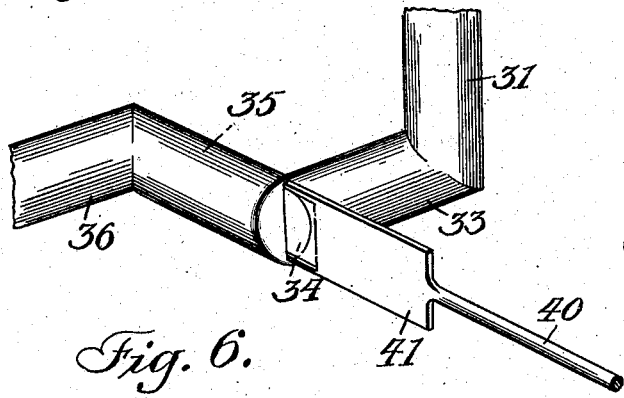
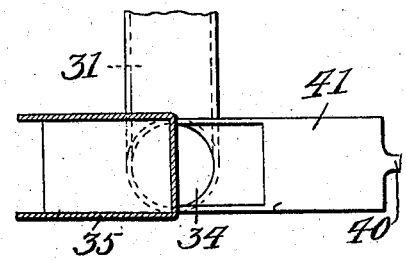

UNITED STATES PATENT OFFICE.

ARTHUR OLIVER, OF EL RENO, OKLAHOMA.

STEAM-CABINET COOKER.

No. 918,898.  Specification of Letters Patent.  Patented April 20, 1909.

Application filed August 28, 1907. Serial No. 390,519.

*To all whom it may concern:*

Be it known that I, ARTHUR OLIVER, a citizen of the United States, residing at El Reno, in the county of Canadian, Oklahoma, have invented certain new and useful Improvements in Steam-Cabinet Cookers, of which the following is a specification, reference being had therein to the accompanying drawing.

This invention relates to a steam cabinet or table, and has for its object the improvement of the construction of a hot-food cabinet for retaining the flavors and moisture in the different meats and vegetables being cooked.

Another object of the invention is the improvement of the construction of a ventilating system for a steam cabinet, which ventilating system enables the food to be cooked or kept warm without permitting the flavor or odor from one compartment to enter or commingle with the odor or flavor in another compartment, whereby the natural flavor of the food cooked in one compartment is not impaired.

Another object of the invention is the improvement of the construction of a steam cabinet, which comprises a minimum number of parts, and is comparatively simple to construct and highly efficient in operation.

With these and other objects in view, the invention consists of certain novel constructions, combinations, and arrangements of parts, as will be hereinafter fully described and claimed.

In the drawings: Figure 1 is a perspective view of a steam cabinet constructed in accordance with the present invention. Fig. 2 is a longitudinal, vertical, sectional view of the structure depicted in Fig. 1, a part of the shelves and the receptacles being removed. Fig. 3 is a transverse, sectional view taken on line 3, 3, Fig. 2, and looking in the direction of the arrow. Fig. 4 is a transverse, sectional view taken on line 4, 4, Fig. 1, and looking in the direction of the arrow. Fig. 5 is a view in front elevation of another embodiment of the present invention. Fig. 6 is a fragmentary, perspective view of a portion of the ventilating apparatus. Fig. 7 is a fragmentary, sectional view of the structure depicted in Fig. 6. Fig. 8 is a sectional view of one of the rotatable valve devices located in each of the meat compartments. Fig. 9 is a transverse, sectional view taken on line 9, 9, Fig. 4.

Referring to the drawings by numerals, 1 designates the body of the cabinet, which is, preferably, supported upon a base or framework 2. The support or base 2 comprises, preferably, an inner wall 3, formed, preferably, of brick having horizontal openings 4 therein. The outer wall of the support or framework 3 comprises a metallic casing 5, which incloses the inner brick-work support or framework 3. I, preferably, employ brick, as it retains heat longer than a metallic frame, thereby minimizing the expense of heating the steam cabinet. The metallic covering or casing 5 also assists in retaining the heat within the furnace of the device. I have, preferably, illustrated an ordinary burner 6 for heating the cabinet, which burner is supported upon a horizontal support 7.

The body 1 of the cabinet is provided, preferably, upon its front with a series of openings, preferably three in number. These openings constitute the front end of compartments 8, 9 and 10. In each compartment, there are provided horizontal brackets 11, supporting detachable or removable shelves 12. It will be obvious that any number of these brackets 11 and shelves 12 may be used, the number being entirely optional with the operator or constructor.

Formed beneath the compartments 8, 9 and 10, is a water receptacle 13, constituting the boiler; leading from the water receptacle or boiler 13, is a steam pipe or compartment 15, which steam pipe or compartment, preferably, extends the entire width of the cabinet and is provided at its upper end with an inclined hood 16, which will direct steam downward toward the bottom of the vegetable compartment 17. Resting upon the floor 18 of the vegetable compartment is a removable, slatted or apertured tray 19. The tray 19 is provided for preventing the receptacles 20 from coming in direct contact with the bottom of the vegetable compartment 17. Furthermore, it will be seen that by reason of the detachable bottom or tray 19, the steam entering from steam passage 15 can easily pass under the receptacles 20 and 21, Fig. 1, thereby permitting a complete circulation of the heating means beneath the vegetable-containing receptacle or dishes.

A slide valve 22 is mounted, preferably, upon the inside of the body of the cabinet, and is provided with a port or opening adapted to register with the port or opening 23 formed in the side of the cabinet, whereby when the ports register, by adjusting the valve 22, air will enter the vegetable compartment 17, thereby permitting the vegetable compartment to be ventilated. There is permitted a down-draft in this compartment, which will be hereinafter fully described.

In each meat compartment 8, 9 and 10, I have provided a rotatable valve device, which comprises a stationary tapering body 24, within which is detachably secured a rotatable valve member 25. The body 24 (see Fig. 8) is tapered from its upper end to its lower end for forming substantially an inverted cone, whereby the rotatable conical-shape valve 25 will fit snug within the body 24. The valve 25 is cut away on its side, at 26, for permitting the steam to pass from the boiler or steam compartment 13 into the valve and subsequently through the port 27 of valve 25 and port 28 of body 24 into the meat compartment. Furthermore, it will be noted that by removing any one of the valves 25, the boiler 13 may be filled with water by pouring the same into the body 24; this body 24 constitutes a funnel, and the valve 25 constitutes a stopper for closing the funnel. If it is desired to permit steam to enter the meat compartments for facilitating the cooking of meats or other foods therein, the valves can be quickly rotated for opening the ports, permitting steam to pass into said compartments, as stated.

The boiler 13 can be drained by means of valved pipe 29, which pipe is provided with an ordinary water gage 30. The valved pipe 29 extends through an aperture formed in the support or brick-work, and thereby constitutes fastening means for securing the cabinet upon its support.

The vertical ventilating pipe 31 is provided with a horizontal, tubular extension 32, which opens into the vegetable compartment 17, near its bottom. The ventilating pipe 31 terminates at its lower end in a horizontal hollow extension 33, which extension 33 opens, preferably, at 34, into not only the meat compartment 10, but also into the right-angularly-disposed portion 35 of the ventilating pipe 36. The horizontal ventilating pipe 36 is in communication with the central meat compartment 9, by means of an aperture 37, while said pipe 36 is in communication with the meat compartment 10, because the inner end of said pipe opens into said compartment.

The inner end of the hollow extension 32 may be closed by means of a slide valve 38, which is mounted in the horizontal flanges 39. Secured to one end of slide valve 38 is a rod 40, which rod extends through the front of the casing and terminates in a grip or handle 41. The valve 38 is provided with an opening or port adapted to register with the inner, open end of the hollow extension 32. The slide-valve 41 is similarly-constructed to the valve 38, and is actuated by the operator grasping the knob 41' of the rod 40. This valve 41 is guided in guides or flanges 39', substantially U-shaped in cross-section. These guides 39' are positioned between the right-angularly disposed portion 35 of the pipe 36, and the wall of the cabinet. It will be noted that these guides 39' constitute brackets for supporting the portion 35 of the horizontal ventilating pipe 36. A downdraft is caused in each meat compartment by the air passing down to the opening in the ventilating pipe; the valve 41 (Fig. 6) when opened, will permit air to pass through pipe 36 and subsequently be discharged into the vertical pipe 31, besides permitting the air from the meat compartment 10 to pass through the open-end 31 of the horizontal portion 33. The valve 41 closes not only the inner end of the portion 33, but also closes the discharge end of pipe 36, as well as preventing communication between pipe 31 and compartment 10. A down-draft will be caused in the vegetable compartment 17 by the air or odors passing down through the valve 38. In Fig. 5, I have illustrated a two-compartment meat cabinet, which is substantially of the same structure as that depicted in Figs. 1 to 4.

The meat compartments are closed by a hinged door 42, which door 42 is provided with a handle 43. A spring-catch 44 projects from the front of the cabinet and is adapted to engage handle 43 and hold the door in an open position. A hinged door or top 45 closes the vegetable compartment, which vegetable compartment is open at its top, see Fig. 1. The door 45 is swung upon its pivot or hinges, through the medium of a handle or grip 46.

It is to be noted that I have constructed a steam cabinet provided with means for heating the same; furthermore, it will be obvious that any kind of heating means may be employed other than that disclosed in the present application, for I may place the body of the steam cabinet over a furnace of a different type from that illustrated. Furthermore, I have provided ventilating means for keeping the air comparatively pure in each compartment, and have also disclosed means for retaining the odors in each compartment. It is important that a down-draft be provided, for causing the heated atmosphere to pass down around the bottom of the dishes or receptacle, and this is accomplished by my peculiarly-constructed ventilating system. Other advantages will be apparent, among which may be mentioned that if an additional amount of heat is desired, the steam may be permitted to enter directly in one or all of the meat compartments.

It is to be noted that the valve 22 is actuated by a rod 40' and a grip or knob 41', the same as valve 41.

Resting upon the bottom and positioned within each meat compartment is a detachable slatted or apertured tray 19', which performs the same function as the tray 19 in the vegetable compartment 17. The trays 19' permit the steam to pass down and under the receptacles which are in the meat compartments, performing the same function as the tray 19.

A drip pipe 31' is positioned within the meat compartment 10 and opens at its upper end into the vegetable compartment 17, and at its lower end into the boiler or water receptacle 13, thereby permitting liquid in the bottom of the vegetable compartment 17 to be drained into the boiler. If it is desired, any suitable stopper may be employed for closing the upper end of the drip pipe 31', so that all of the steam will pass through the steam passage 15 and be discharged downward toward the bottom of the vegetable compartment 17.

What I claim is:

1. In a steam-cabinet cooker, the combination with a body, said body provided with a plurality of compartments, of a ventilating pipe provided with a horizontal portion, the horizontal portion communicating at its inner end with one of the compartments of the body, guide-flanges formed upon said body within the compartment and contiguous to the inner end of said extension of the ventilating pipe, a horizontal ventilating pipe extending across the compartment and opening at its outer end into the other compartment, said ventilating pipe opening at one end contiguous to the guide flanges, and a slide-valve provided with a port, slidably mounted upon said flanges, said port and the inner end of said hollow extension adapted to register for permitting direct communication between the compartment in which the guides are positioned and the inner end of said extension, and said valve adapted to be adjusted upon the flanges for preventing communication between the horizontal ventilating pipe and the hollow extension.

2. In a steam-cabinet cooker, the combination with a body provided with a compartment, said body provided with a side-opening, of a plurality of guides positioned within said compartment and formed contiguous to opposite portion of said side-opening, a horizontal ventilating pipe secured near one end to said guides, said ventilating pipe opening upon said side-opening, said side-opening partly covered by said ventilating pipe, and movable valve means interposed between the side-opening and said ventilating pipe and being capable of entirely closing the side-opening and also closing the end of the ventilating pipe contiguous to said side-opening.

3. In a steam-cabinet cooker, the combination with a body provided with a series of compartments, of a horizontal ventilating pipe extending across a plurality of said compartments and opening at one end into a single compartment and guides secured at the opposite end of said ventilating pipe, said guides placing the ventilating pipe away from one side of said body, said ventilating pipe provided intermediate its ends with a port opening into one of the compartments, said body provided contiguous to said guides with a ventilating side-opening, the ventilating pipe partly closing said side-opening and leaving a portion thereof free for permitting direct communication between one of the compartments and said side-opening, and valve means carried by said guides, and being capable of entirely closing the side-opening and preventing direct communication between the side-opening and the ventilating pipe.

In testimony whereof I hereunto affix my signature in presence of two witnesses.

ARTHUR OLIVER.

Witnesses:
FRANK MEYER,
E. F. STEPHENS.